United States Patent [19]

Carré et al.

[11] Patent Number: 4,660,684
[45] Date of Patent: Apr. 28, 1987

[54] DISC BRAKE WITH AUTOMATIC ADJUSTMENT

[75] Inventors: Jean-Jacques Carré, Le Raincy; Pierre Pressaco, La Courneuve, both of France

[73] Assignee: Societe Anonyme D.B.A., Paris, France

[21] Appl. No.: 908,877

[22] Filed: Sep. 15, 1986

Related U.S. Application Data

[63] Continuation of Ser. No. 787,698, Oct. 15, 1985, abandoned, which is a continuation of Ser. No. 556,813, Dec. 1, 1983, abandoned.

[30] Foreign Application Priority Data

Dec. 23, 1982 [FR] France ................................ 82 21683

[51] Int. Cl.⁴ ............................................. F16D 65/56
[52] U.S. Cl. ............................... 188/71.9; 188/196 D; 192/111 A
[58] Field of Search ................. 188/71.9, 196 D, 203; 192/111 A

[56] References Cited

U.S. PATENT DOCUMENTS

| 3,610,373 | 10/1971 | Burnett | 188/196 D X |
| 3,878,923 | 4/1975 | Farr | 188/71.9 X |
| 4,014,415 | 3/1977 | Pickel | 188/71.9 X |
| 4,056,173 | 11/1977 | Farr | 188/196 D X |
| 4,246,985 | 1/1981 | Shimizu et al. | 188/71.9 |

FOREIGN PATENT DOCUMENTS

| 1750056 | 12/1970 | Fed. Rep. of Germany . |
| 2837142 | 3/1979 | Fed. Rep. of Germany ..... 188/71.9 |
| 2326624 | 4/1977 | France . |
| 47027 | 4/1980 | Japan ................................. 188/71.9 |
| WO82/00052 | 1/1982 | Japan ................................. 188/71.9 |

Primary Examiner—George E. A. Halvosa
Attorney, Agent, or Firm—Larry J. Palguta; Ken C. Decker

[57] ABSTRACT

The subject of the invention is a disc brake with automatic adjustment of the type incorporating a caliper (10) mounted to slide on a fixed support by way of at least one axial pin, a brake motor (34) acting directly on a first friction element (26) and as a result of reaction via the caliper (10) on a second friction element (30). The brake motor (34) incorporates a mechanical control (48, 50, 54) acting on a hydraulic control piston (36) via an automatic-adjustment device. The automatic-adjustment device is formed by a screw (68) -and-nut (88) system of reversible pitch, which is actuated by the piston (36) beyond a predetermined stroke of the latter. According to the invention, a monitoring piston (80) immobilizes a sleeve (114) fixed in rotation to the nut (88), when the hydraulic control pressure reaches a predetermined value. The invention is used for the braking of motor vehicles.

9 Claims, 2 Drawing Figures

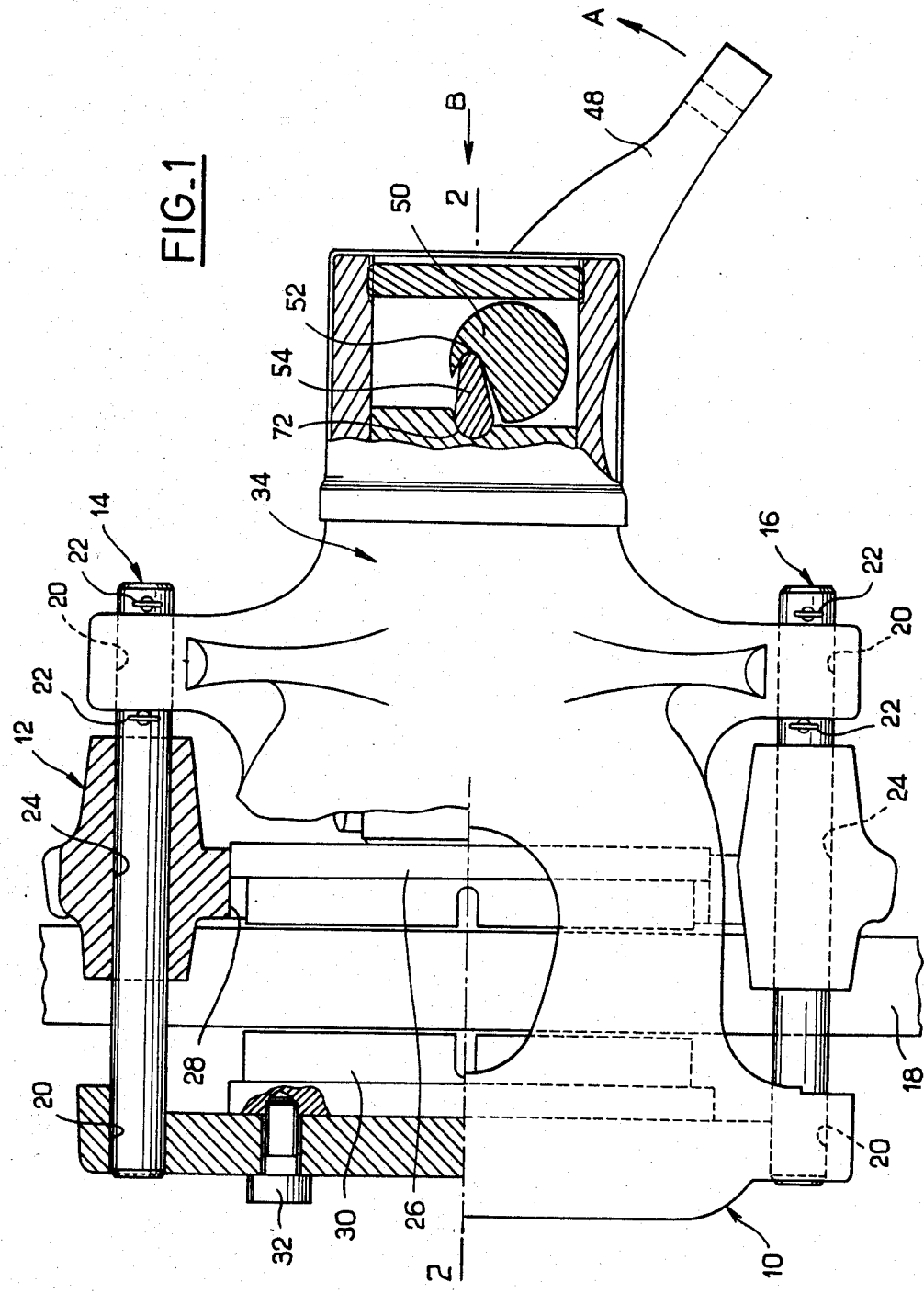
FIG._1

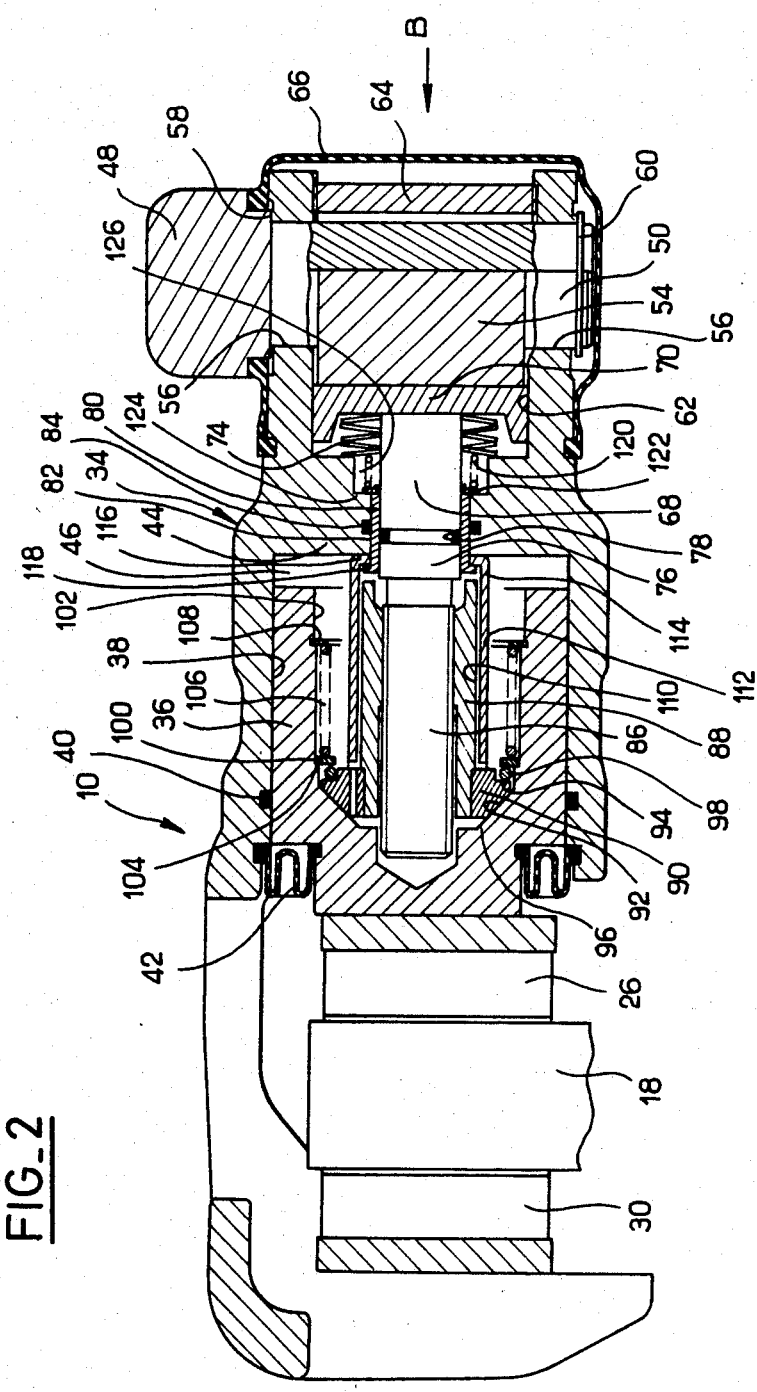
FIG._2

DISC BRAKE WITH AUTOMATIC ADJUSTMENT

This is a continuation of abandoned application Ser. No. 787,698, filed Oct. 15, 1985 which is a continuation of abandoned application Ser. No. 556,813, filed Dec. 1, 1983.

The invention relates to a disc brake for a motor vehicle.

The invention relates more particularly to a disc brake of the type with a sliding caliper which incorporates a brake motor capable of being actuated independently either by a fluid pressure or by a mechanical control. The actuation of the brake motor directly pushes a first friction element so as to engage frictionally with a first face of a rotary disc, and, as a result of reaction via the sliding caliper a second friction element so as to engage frictionally with a second face of the disc opposite the first face. The caliper slides relative to a fixed support which directly or indirectly receives the torque generated by the friction elements. In brakes of this type, because of the initial thickness of the friction elements, it is necessary to have an automatic-adjustment device located on the mechanical control in such a way that the stroke of this control does not change as a function of the wear of the friction elements. Many solutions have been proposed to solve this problem. Nevertheless, these systems usually have the disadvantage that they ensure adjustment whatever the reason causing this automatic adjustment to be actuated. This type of device is used both to compensate the wear of the friction elements, which is normal, and to compensate the elastic deformations of the caliper at high hydraulic control pressures. This type of device makes it necessary to have an idle stroke which does not involve automatic adjustment and which is relatively substantial and of the order of the deformation detected on the caliper when it is actuated.

To solve this problem, that is to say to avoid a substantial idle stroke without risking over-adjustment causing a residual torque after the brake has been released, the applicant proposed in French Patent No. 77-27268 published under No. 2402806 a disc brake of this type in which the adjustment device was neutralized by means of a Bourdon tube beyond a predetermined value of the hydraulic control pressure. In this way, automatic adjustment can occur only at low control pressures, that is to say when the deformation of the caliper is not involved, only the wear of the friction elements being taken into account. Although this solution solves the problem in question, it has the following disadvantages: since the system is based on the friction of the Bourdon tube on the adjustment device, the friction level can change in time and thereby affect the operating clearance which it is desirable to have between the rotary disc and the friction elements; also, the production of a Bourdon tube of this type involves considerable tolerance ranges which can influence the balance of the braking torques of two wheels on one and the same axle; finally, with this type of device, it is difficult to vary the level of hydraulic pressure at which the operation of the automatic-adjustment device is to be prevented.

The object of the invention is to propose a disc brake of the type described above, in which these disadvantages are eliminated, but which has the advantages of the latter.

For this purpose, the invention proposes a disc brake with automatic adjustment of the type incorporating a caliper mounted to slide on a fixed support by means of at least one axial pin a brake motor acting directly on a first friction element and, as a result of reaction via the caliper on a second friction element, the said brake motor incorporating a mechanical control acting on a hydraulic control piston via an automatic-adjustment device, said adjustment device being formed by a screw-and-nut system of reversible pitch which is capable of being actuated by said hydraulic piston beyond a predetermined stroke of the latter, characterized in that said automatic-adjustment device incorporates a sleeve which is fixed in rotation to said nut and which interacts with a monitoring piston immobilizing said sleeve in its rotation and its translational movement when the hydraulic pressure acting on said hydraulic control piston reaches a predetermined value.

It will be understood that by means of such a structure the active cross-section of the monitoring piston can be modified easily to adjust the locking of the automatic-adjustment device to the desired pressure level, this active cross-section not changing in time, and the production of the assembly and, in particular, of the locking device is simplified, thus ensuring the reliability of the system.

Other characteristics and advantages of the disc brake which is the subject of the present invention will appear from a reading of the detailed description of the brake, with reference to the attached drawings in which:

FIG. 1 is a plan view of a disc brake produced according to the teaching of the present invention; and FIG. 2 is an enlarged cross-sectional view along the line 2—2 of FIG. 1.

The disc brake illustrated in FIGS. 1 and 2 incorporates a moveable caliper 10 mounted to slide on a fixed member or support 12 by means of two pins 14 and 16 extending parallel to the axis of rotation of the rotary disc 18. In the embodiment illustrated and as shown more particularly in FIG. 1, the axial pins 14 and 16, which are fixed to the caliper 10 by means of perforations 20 and pins 22, pass in bores 24 formed in the fixed support 12 and are capable of sliding relative to these bores 24 and therefore relative to the fixed support 12. A first friction element 26 is mounted in an orifice 28 formed in the fixed support 12, this orifice 28 ensuring that the friction element 26 is anchored and can slide. A second friction element is fastened to the caliper 10 by means of two screws 32 which ensure that the friction element 30 is anchored on the caliper 10. Furthermore, the caliper 10 is equipped with a brake motor 34 incorporating a hydraulic control and a mechanical control, as will be seen more particularly in FIG. 2. In a conventional way, the hydraulic control is ensured by a hydraulic control piston 36 mounted to slide in bore 38 formed in the brake motor 34. The leak-proofing between the piston 36 and the bore 38 is ensured by a gasket 40, the piston moreover being protected by a piston cover 42. The piston 36 and a bottom wall 44 of the bore 38 define a chamber 46 which can be connected to a pressure source (not shown) such as, for example, the master cylinder of the vehicle.

The mechanical control is ensured by means of a lever 48 which can be connected to a cable or the like (not shown) fixed to an axle 50 in which is formed a groove 52 receiving an elongate connecting rod 54. The axle 50 is received in two bores 56 formed in the brake motor 34. The axle 50 is immobilized longitudinally in relation to the brake motor by means of a shoulder 58 formed on the lever 48, on the one hand, and by means of a circlip or the like 60 on the other hand. The axle 50 and the elongate connecting rod 54 are accommodated in a blind bore 62 formed in the brake motor 34, and the open part of the bore is provided with a screwed shutter 64 in the embodiment illustrated. The assembly consisting of the lever, axle and bore 62 is protected by a flexible cover 66. The bore 62 also receives a screw 68, a widened portion 70 of which incorporates a groove 72 which interacts with the connecting rod 54. A restoring spring 74 is located between the bottom of the blind bore 62 and the widened portion 70. The screw 68 incorporates a cylindrical portion 76 in which a groove having a gasket 78 is formed. This gasket 78 and the cylindrical part 76 are capable of sliding relative to an annular piston 80 mounted in a bore 82 of the wall 44. A gasket 84 is mounted in the bore 82 so as to make the possible sliding of the annular piston 80 leak-proof in relation to the bore 82. The screw 68 is prolonged in the chamber 46 by a threaded portion 86 of reversible pitch, on which a nut 88 is fitted. The nut 88 carries, on its end opposite the wall 44, an attached part 90 comprising, on the one hand, a conical portion 92 and, on the other hand, a bearing race 94. The conical portion 92 is capable of interacting with a conical portion 96 formed in the piston 36. The bearing race 94 is capable of interacting with a ball thrust-bearing 98 coaxial with the threaded portion 86 and located opposite a washer 100 forming a second bearing race capable of sliding in a bore 102 formed in the piston 36. The washer 100 is applied against a shoulder 104 of the bore 102 by means of a spring 106 which itself bears on a circlip or the like 108 fitted in a groove formed in the bore 102 of the piston 36. When the washer 100 bears on the shoulder 104 and when the conical portion 92 bears on the conical portion 96, a clearance is provided between the ball thrust-bearing 98 and the washer 100 so as to define the operating clearance of the brake. In addition to the attached part 90, the nut 88 incorporates, in the embodiment illustrated, a plurality of grooves 110 in which are mounted lugs 112 of a sleeve 114 which are capable of sliding relative to the nut 88, but which are fixed in rotation to the latter. The sleeve 114 carries on its end close to the wall 44 a collar 116 which is folded radially inwards and which is located between the wall 44 and a collar 118 folded radially outwards and formed on one end of the annular piston 80. The other end of the annular piston is pushed to the left, with reference to FIG. 2, by means of a control spring 120 located between the spring 74 and a washer 122 having an outside diameter greater than the outside diameter of the cylindrical portion of the annular piston 80, so that the end of the annular piston is aligned with the wall 124 of a recess 126 formed in the bottom of the bore 62, the annular piston 80 forming a monitoring piston for the automatic-adjustment device.

The brake which has just been described functions as follows:

At rest, the various elements of the brake occupy the positions illustrated in FIGS. 1 and 2.

When the brake is actuated by means of the mechanical control, the lever 48 is rotated in the direction of the arrow A in FIG. 1. This rotation causes rotation of the axle 50 in an anti-clockwise direction. Via the groove 52 this rotation pushes the connecting rod 54 in a general direction illustrated by the arrow B of FIG. 1. Via the groove 72 the connecting rod 54 pushes the widened portion 70 of the screw 68 counter to the spring 74. Since the cylindrical portion 76 of the screw 68 can slide relative to the annular monitoring piston 80, the screw 68 is likewise displaced in the direction of the arrow B also shown in FIG. 2. This movement of the screw 68 is transmitted by means of the threaded portion 86 to the nut 88, the attached part 90 of which bears on the piston 36 via the two conical portions 92 and 96 located opposite one another. The friction occurring between the two conical portions prevents the nut 88 from rotating relative to the screw 68, and consequently the force generated on the connecting rod 54 is transmitted to the piston 36 and therefore to the friction element 26 which is adjacent to it. The reaction of the friction element 26 on the disc 18 causes a counter-reaction of the axle 50 on the brake motor 34 and more specifically on the bores 56 of this motor 34. The caliper 10 then slides relative to the fixed support 12 by means of its columns 14 and 16, so as to apply the friction element 30 against the opposite face of the disc 18. When the manual control is released, the various elements of the brake resume the positions shown in FIGS. 1 and 2 by means of the restoring spring 74.

When the brake is actuated by means of the hydraulic control, a hydraulic pressure is applied in the chamber 46 so as to push the piston 36 to the left with reference to FIG. 2. If the movement of the piston 36 in relation to the nut 88 does not exceed the operating clearance defined between the ball thrust-bearing 98 and the washer 100, the movement of the piston 36 has no effect on the automatic-adjustment device, and only the conical portions 92 and 96 are released from one another. If the movement of the piston 36 is greater than the predetermined operating clearance, the nut 88 is driven to the left, with reference to FIG. 2, by the piston 36 via the part 90, the thrust-bearing 98, the washer 100 and the spring 106 which is itself driven by the circlip 108 fixed to the piston. Since the screw 68 is immobilized axially by means of the spring 74, the nut 88, because of the reversible pitch, rotates relative to the screw 68 so that it can follow the movement of the piston 36. In this operating phase, the sleeve 114 is free to rotate with the nut 88, the control spring 120 having pushed the annular monitoring piston 80 to the left, with reference to FIG. 2, and the collar 118 of this annular piston does not apply the collar 116 of the sleeve 114 against the wall 44 of the brake motor. If the hydraulic pressure is then released, the gasket 40 causes the piston 36 to return slightly, in a conventional way, and the conical part 96 of the latter comes into contact with the conical part 92 of the nut, preventing the latter from rotating. In the same way as when the brake is applied, the nut has rotated by moving to the left, and the automatic-adjustment device is therefore now in a new position offset to the left and prevents the piston from resuming its initial position.

If, on the other hand, the brake is not released immediately, the pressure in the chamber 46 continues to rise, and under the effect of this pressure and the force generated by the piston 36 the caliper is deformed. It is therefore necessary to block the operation of the adjustment device before the start of mechanical deformation of the caliper.

When the pressure in the chamber 46 reaches the level defined by the annular cross-section of the annular monitoring piston 80 and the force of the control spring 120, the annular piston 80 is displaced to the right, with reference to FIG. 2, under the effect of this pressure and by means of its collar 118 clamps the collar 116 of the sleeve 114 against the wall 44 of the brake motor. Since the sleeve 114 is then immobilized in its rotation and axially by the annular piston 80, any rotation of the nut 88 becomes impossible because of the grooves 110 and the associated tabs 112. Since it is impossible for the nut 88 to rotate, it cannot follow the piston 36. The attached part 90 of the nut 88 compresses the spring 106 by means of the ball thrust-bearing 98 and the washer 100. The piston 36 is displaced to the left under the effect of the pressure prevailing in the chamber 46, which generates deformations in the caliper because of the forces used, without putting the automatic-adjustment device into effect, the clamping force generated by the annular piston and more specifically by its collar 118 on the collar 116 of the sleeve 114 being greater than the force 106. When the hydraulic pressure is released, in a first stage the spring 106 expands and brings the washer 100 up against the shoulder 104, and the nut 88 is then no longer subjected to an axial force transmitted by the thrust-bearing 98, but remains without clearance between the bearing race 94, the ball thrust-bearing 98 and the washer 100. In a second stage, the gasket 40 brings the piston 36 back to the right, in FIG. 2, in a conventional way, until the conical part 96 of the piston comes up against the conical part 92 of the part 90. The operating clearance now appears between the ball thrust-bearing 98 and the washer 100. In a third stage, since the pressure continues to decrease, the control spring 120, pushing back the washer 122, displaces the annular piston 80 to the left in FIG. 2, thus freeing the collar 116 which is again free to rotate with the nut 88 when the latter is caused to rotate.

As may be seen from the foregoing description, the device which is the subject of the invention is especially reliable because of the simplicity of the components obtained by elementary production means. By changing the active surface of the annular piston and by modifying the restoring spring of this annular piston, it is especially easy to modify the predetermined pressure value at which the automatic-adjustment device becomes inoperative. It is easily possible, likewise, for the collars 116 and 118 to be reversed, that is to say the collar of the annular piston can be folded radially inwards and the collar of the sleeve 114 folded radially outwards, in the event that the cylindrical portion 76 of the screw 68 has a diameter greater than that of the sleeve 114. Finally, it is possible to provide any device on the collars and on the wall 44 of the cylinder to achieve blocking of the sleeve 114 even for very low hydraulic pressures.

It is clear that the mechanical control described above can be replaced by any other control which generates an axial force on the screw in the direction of the arrow B in FIG. 2.

We claim:

1. A disc brake with automatic adjustment, of the type comprising a caliper slidingly mounted on a fixed support and supporting a brake motor acting directly on a first friction element and, as a result of reaction via the caliper, on a second friction element, said brake motor comprising a control piston acting on said first friction element and slideable in a bore of a housing having a stationary bottom wall, the control piston actuatable by hydraulic pressure in a pressure chamber in said bore and by an outer mechanical control device via an automatic adjustment device formed by a screw-and-nut system of reversible pitch having an axis, the adjustment device capable of being actuated as a result of displacement of said control piston by said hydraulic pressure and beyond a predetermined stroke thereof, said screw extending through said bottom wall and having one end opposite said control piston coupled to said mechanical control device, said screw kept immobilized axially in a rest position and in coupling engagement with said mechanical control device by means of a return spring when the mechanical control device is not actuated, and hydraulic pressure actuatable neutralizing means for preventing rotation of said nut relative to said screw of said automatic adjustment device when hydraulic pressure actuating said control piston exceeds a predetermined pressure, the neutralizing means enabling an accurate determination of said predetermined pressure, said neutralizing means comprising a sleeve member connected to said nut for rotation therewith and capable of axial displacement in relation thereto, said sleeve member selectively cooperating with a spring-biased reciprocable annular monitoring piston sealingly mounted coaxial to said screw and having an active end of predetermined effective surface area exposed to the hydraulic pressure in said pressure chamber and independently actuatable relative to the screw to immobilize said sleeve member both in rotation and axial displacement when said predetermined pressure is exceeded.

2. The disc brake according to claim 1, wherein said monitoring piston is slidingly mounted in said housing of said brake motor and has the active end cooperating in friction contact engagement with one end of said sleeve member.

3. The disc brake according to claim 2, wherein said active end of the monitoring piston comprises an annular flange portion adapted for cooperating in friction contact engagement with a complementary annular flange portion at said one end of said sleeve member.

4. The disc brake according to claim 3, wherein said flange portion of said monitoring piston is arranged to immobilize axially and angularly said flange portion of said sleeve member by frictionally and pressingly clamping the flange portion of said sleeve member against the bottom wall of said pressure chamber of said brake motor when said predetermined pressure is exceeded.

5. The disc brake according to claim 4, further comprising a control spring biasing said monitoring piston axially away from said wall.

6. The disc brake according to claim 5, wherein said sleeve member and said nut have cooperating groove and projection formations ensuring the connection for rotation therebetween.

7. The disc brake according to claim 6, wherein said screw is maintained in a retracted position by means of the return spring when said mechanical control is not actuated, said screw being displaceable against said return spring when said mechanical control is actuated, said control spring bearing by one end of said return spring and by the other end on said monitoring piston.

8. The disc brake according to claim 1, wherein said nut comprises a conical portion adapted for friction contact engagement with another conical portion carried by said control piston, said nut forming a bearing race for an axial ball thrust-bearing which is mounted to provide axial play between said bearing race and a second bearing race formed by an annular element capable of sliding relative to said control piston and against a spring when relative movement between said nut and said piston exceeds said axial play.

9. An automatically adjustable disc brake, comprising a caliper slidingly mounted on a fixed support and supporting a brake motor acting directly on a first friction element and, as a result of reaction via the caliper, on a second friction element, said brake motor comprising a control piston acting on said first friction element and actuatable by hydraulic pressure in a pressure chamber of a housing having a stationary bottom wall and by a mechanical control device via an automatic adjustment device formed by a screw-and-nut system of reversible pitch, the adjustment device actuatable as a result of displacement of said control piston by said hydraulic pressure and beyond a predetermined stroke thereof, said screw extending through said bottom wall and having one end opposite said control piston coupled to said mechanical control device, said screw being kept immobilized axially in a rest position and in coupling engagement with said mechanical control device by means of a return spring when said mechanical control device is not actuated, and pressure actuatable neutralizing means for neutralizing said automatic adjustment device, said neutralizing means comprising a sleeve member connected to said nut for rotation therewith and axially displaceable relative thereto, said sleeve member selectively cooperating with an axially slideable and spring-biased monitoring piston extending through said bottom wall and having an active end of predetermine effective surface area exposed to the hydraulic pressure in said pressure chamber and independently actuatable relative to the screw to immobilize said sleeve member both in rotation and axial displacement when hydraulic pressure actuating said control piston reaches a predetermined pressure, the neutralizing means enabling an accurate determination of said predetermined pressure, said active end of the monitoring piston comprising an annular flange for cooperating in friction contact engagement with a complementary annular flange at one end of said sleeve member, the flange of said monitoring piston immobilizing axially and angularly the flange of said sleeve member by effecting clamping engagement of the flange of said sleeve member against said bottom wall of said pressure chamber of said brake motor when said predetermined pressure is reached.

* * * * *